United States Patent [19]

Bergler

[11] Patent Number: 4,597,181
[45] Date of Patent: Jul. 1, 1986

[54] PLANING TOOL HAVING A QUICKLY RELEASABLE ROTARY PLANER HEAD

[75] Inventor: Otto Bergler, Muhlacker-Lomersheim, Fed. Rep. of Germany

[73] Assignee: Black & Decker Overseas AG, Vaduz, Liechtenstein

[21] Appl. No.: 609,221

[22] Filed: May 11, 1984

[30] Foreign Application Priority Data

May 24, 1983 [DE] Fed. Rep. of Germany ....... 3318745

[51] Int. Cl.$^4$ .............................................. B27C 1/10
[52] U.S. Cl. ....................................... 30/475; 30/478
[58] Field of Search ..................... 145/4, 4.1, 4.2, 5 B

[56] References Cited

U.S. PATENT DOCUMENTS

| 1,182,117 | 5/1916 | Tillman | 145/5 B |
| 1,899,204 | 2/1933 | Matthews | 145/4 |
| 2,233,998 | 3/1941 | Evjen | 145/4.1 |
| 2,540,258 | 2/1951 | Harris | 145/4 |
| 2,649,873 | 8/1953 | Reich et al. | 145/4 |
| 2,719,553 | 10/1955 | Ballard | 145/4 |

Primary Examiner—Frederick R. Schmidt
Assistant Examiner—J. T. Zatarga
Attorney, Agent, or Firm—Burns, Doane Swecker & Mathis

[57] ABSTRACT

A planing tool has a rotary planer head driven rotatably by an electric motor. The planer head is removably connected to a drive shaft which comprises a plurality of elements which can be axially disengaged to enable the planer head to be easily replaced.

7 Claims, 12 Drawing Figures

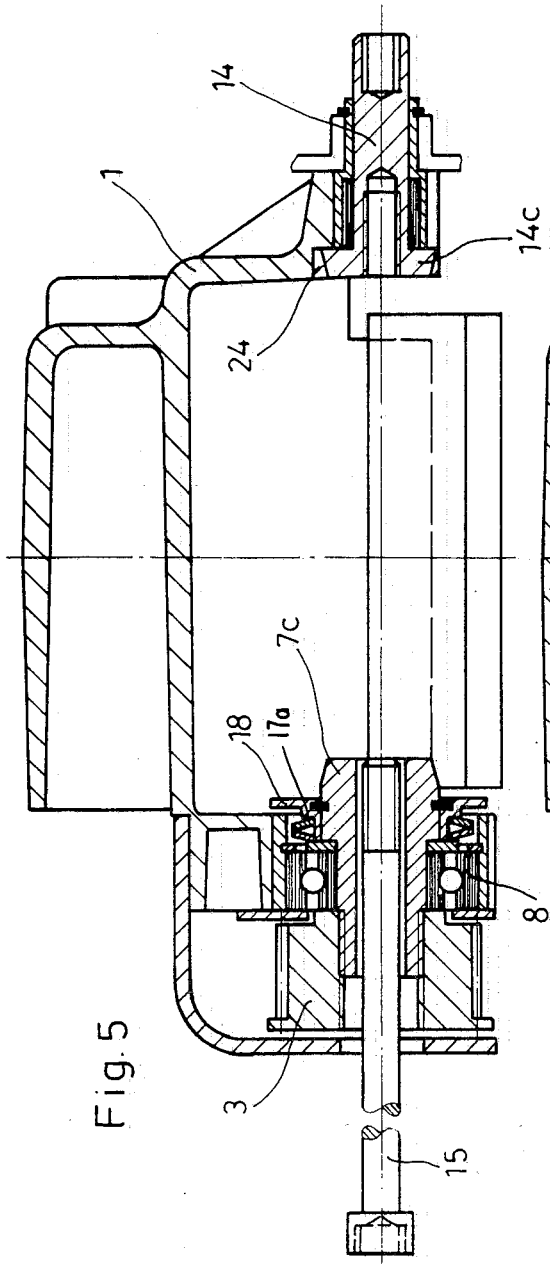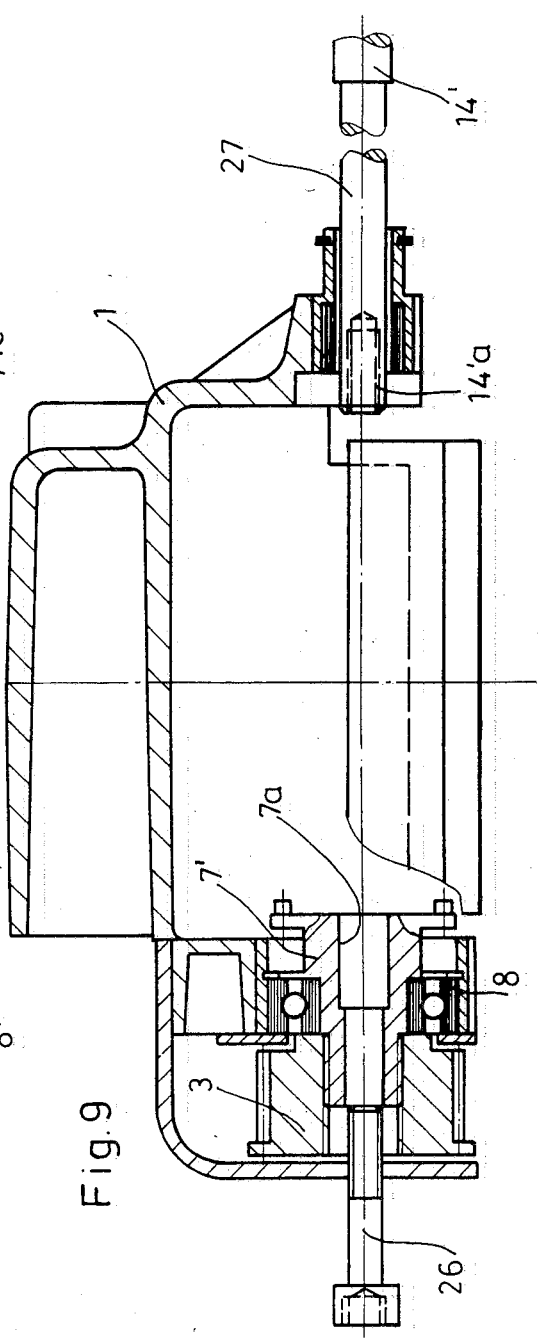

PLANING TOOL HAVING A QUICKLY RELEASABLE ROTARY PLANER HEAD

BACKGROUND AND OBJECTS OF THE INVENTION

The invention concerns a planing tool of the type having an electric motor for driving a rotary planer head. The motor is connected with a drive wheel joined for rotation with a drive shaft, the latter being radially and axially supported in bearings in the housing of the planer head.

Known manual or hand-held planing tools were heretofore suitable exclusively for the smooth planing of surfaces and for fitting work, for example of window frames in wall openings or for the planing of doors at the floor level. Rabbets could also be finished-planed. The feed table or the chip thickness limiter of the known manual planing tools are adjustable in a plane parallel with respect to the guide or discharge plate. The discharge plate is generally set exactly tangent to the circle of rotation of the planer cutters and is thus not adjustable. The planar structure of the workpiece to be processed is therefore not altered. Even in the case of the so-called rough plane or the barrel plane, which represent to a certain extent an exception to the general structure of such tools, the planar character of the workpiece remains essentially unchanged. A shaping or profiling of wood, such as required in the making of molding strip, picture frames, contoured panelings of any type and molded covering boards, cannot be effected with such manual planer tools. At the present time, such work is performed essentially on large, stationary special milling machines, etc., which are capable of producing standard commercial profiles or molded boards only. Special molding strips are, at the present time, produced manually on conventional milling machines in a relatively expensive manner. This requires specialized guiding means.

It is further known to insert molding cutters into planer heads, which make it possible in a fashion similar to rough planes, to obtain a certain surface structure, but for safety reasons in such cases, so-called deflectors must also be inserted. The exchange of such cutters in planer heads held fixedly in the manual plane is relatively cumbersome and, for reasons of safety, possible to a limited extent only.

It is, therefore, an object of the present invention to provide a planing tool of the afore-mentioned type wherein the replacement of the planer head is readily possible, so that planer heads intended specifically for molding may be interchanged in keeping with the type of profile to be produced.

SUMMARY OF THE INVENTION

In the present invention the planer head is designed as a structural part independent of the drive shaft, and has a continuous axial bore. The drive shaft comprises a bearing journal provided with an axial bore and a socket pin, which is inserted into the axial bores to secure the planer head. This configuration provides the advantageous capability of a rapid and easy replacement of the entire planer head, so that cumbersome insertion and alignment of the cutters may be eliminated. This may be performed with the planer head removed from the plane. Furthermore, the regrinding of even complex molding cutters may be accomplished without difficulty.

It is advantageous to provide the socket pin in the form of a threaded bolt connecting the bearing journal located on one side of the housing with a second bearing journal supported in the other side of the housing. This results in a stable, bilateral support. In order to further secure the axial position of the planer head, it is appropriate to provide the second bearing journal with a stop for the planer head and with threading for the connection of the threaded bolt equipped with a head on its side facing away from the threads. A structurally simple configuration is obtained by equipping the bearing journal associated with the drive wheel with an axial bore and holding it in a fixed bearing and making the second bearing journal axially displaceable in its bearing location. Further advantages are achieved, such as an accurate but rapid alignment of the planer head; overload security is also attained in a simple manner, preventing damage to parts of the manual plane.

THE DRAWING

The invention shall become apparent by means of the following detailed description of preferred embodiments thereof in connection with the accompanying drawings in which like numerals designate like elements, and in which:

FIG. 5 is a section similar to that of FIG. 3, but with the planer head removed;

FIG. 9 depicts the manual plane of FIG. 7 in a position with the planer head dismantled;

DETAILED DESCRIPTION OF PREFERRED EMBODIMENTS OF THE INVENTION

Figure 1:
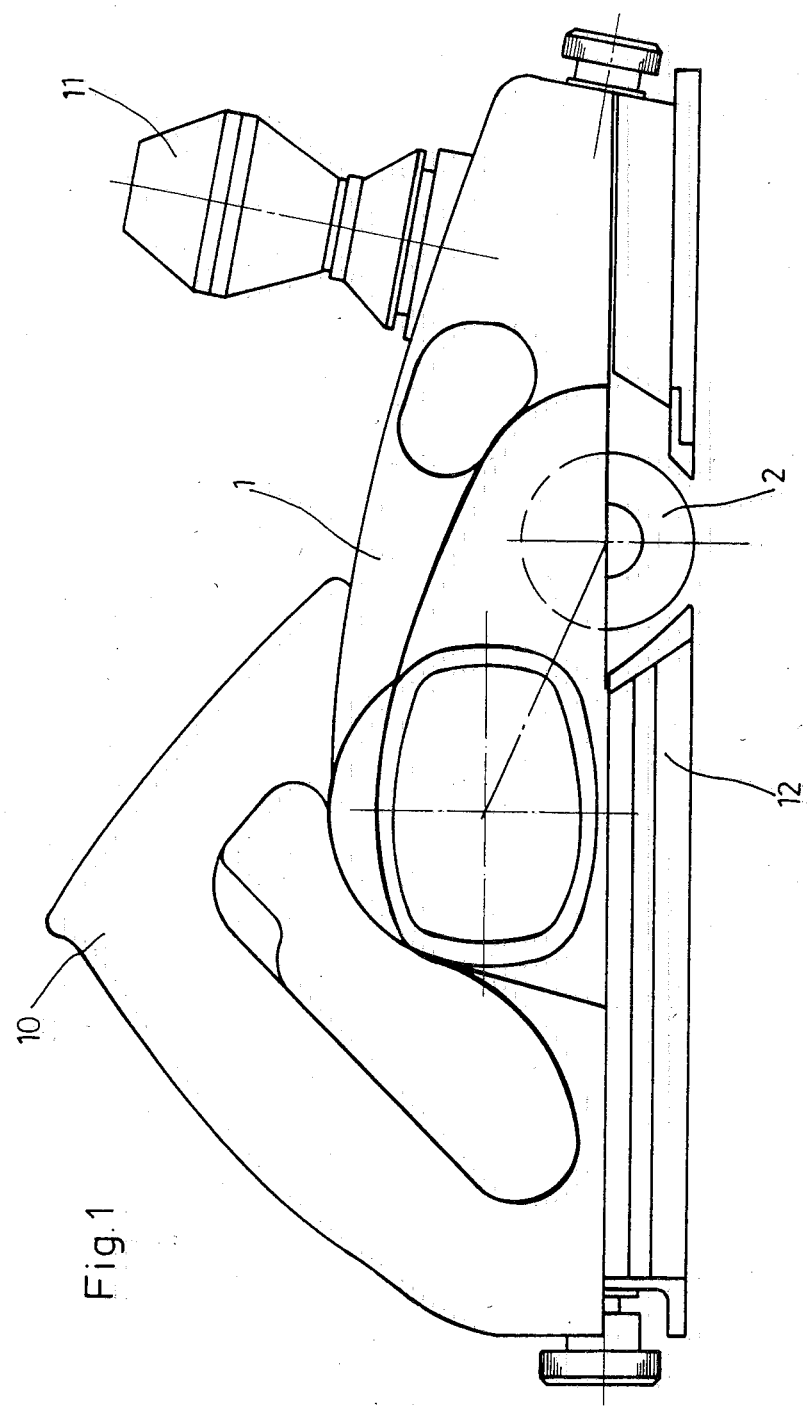
FIG. 1 depicts a schematic lateral elevation of a manual plane according to the invention, driven by an electric motor.
Figure 2:
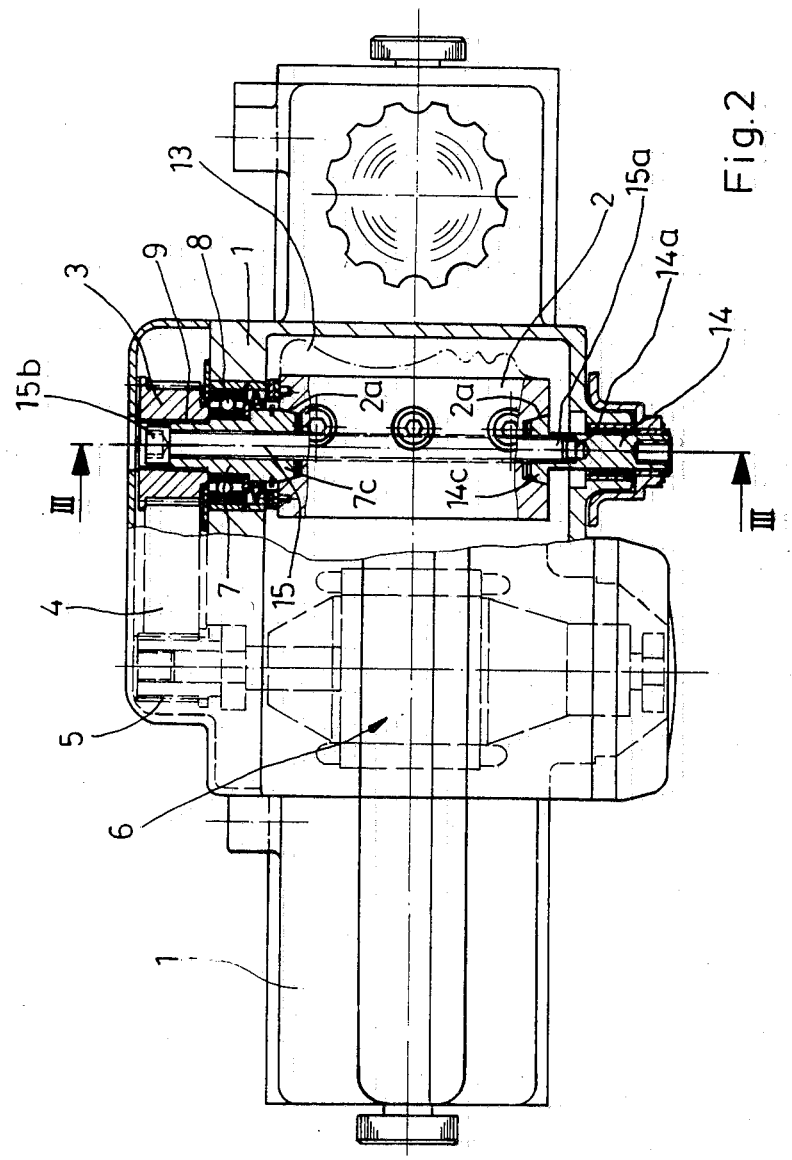
FIG. 2 is a partially broken-away top view of the manual plane of FIG. 1.
Figure 3:
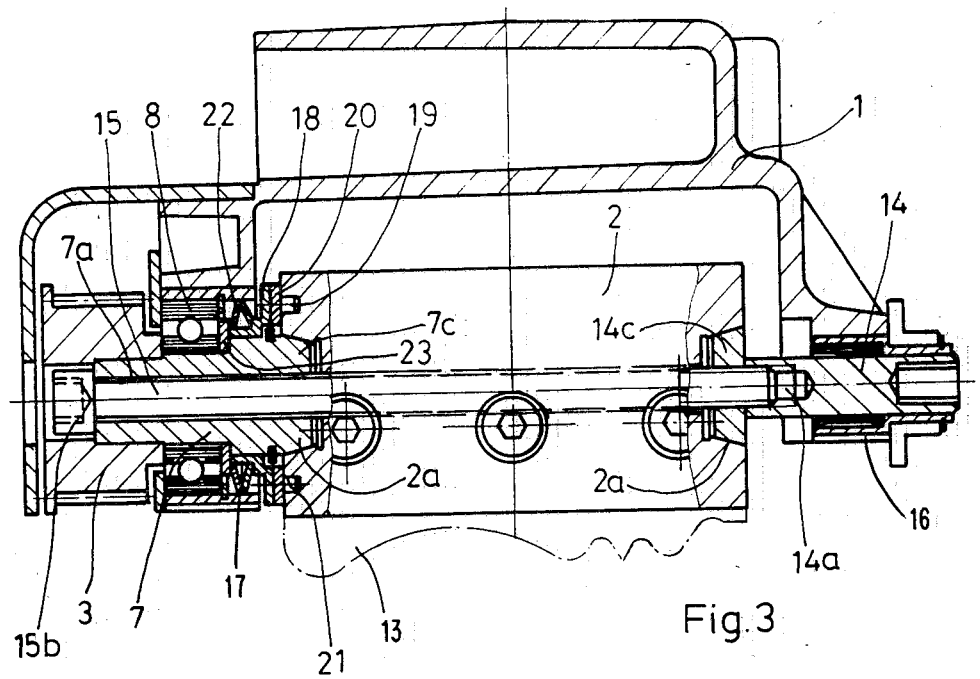
FIG. 3 is a section through the manual plane of FIG. 2 along the line III—III.

In FIGS. 1 and 2, in a housing 1 of a manual or hand-held plane, a planer head 2 is supported rotatingly. The planer head is connected for rotation with a drive wheel 3 which is rotated by means of a drive belt 4 by a pinion 5 of an electric motor 6. The planer head 2 is connected for rotation with a bearing journal 7, which in turn, is arranged rotatingly in a ball bearing 8 located in the housing 1. The journal 7 is joined for rotation with the drive wheel 3, for example, by means of a multiple key wedge connection 9. The plane head 2 rotated in this manner may thus be displaced, in a fashion known in itself, with the aid of the manual handle 10 of a manual knob 11, together with the housing 1 of the manual plane on a support surface 12 for the working process.

In contrast to known configurations, the planer head 2, which may be equipped for example with a molding cutter 13, is not itself connected directly to a one-piece drive shaft. Rather, the drive shaft is, in the embodiment shown, in the form of an assembly comprising the bearing journal 7, a second bearing journal 14 disposed on the side of the housing opposite to the bearing 8 and a threaded rod bolt 15 connecting the two bearing journals with each other and with the planer head 2. The bolt 15 has a threaded free end 15a screwed into an internal thread 14a of the bearing journal 14. The threaded bolt 15 has a head 15b with an inner hexagonal recess. The head abuts against an outwardly facing frontal surface of the bearing journal 7. The bearing journal 14 has a centering cone 14c corresponding to a similar centering cone 7c of the bearing journal 7. The centering cones 7c, 14c engage recesses 2a in the planer head 2 which correspond in shape to the centering cones. The bearing journal 14 also has at its outwardly directed end an internal hexagon socket and is maintained displaceably in a needle bearing 16. If, therefore, the threaded bolt 15 is screwed into the bearing journal 14, then the cone 7c and the cone 14c, are pressed into, respectively, the corresponding recesses 2a of the planer head 2, the latter thus being secured axially in the housing 1. The bearing journal 7 is held axially in the fixed bearing 8.

Figure 4:
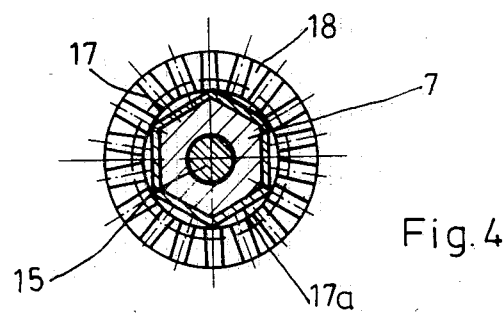
FIG. 4 is a cross-section through a bearing journal of the manual plane of FIG. 4.
Figure 6:
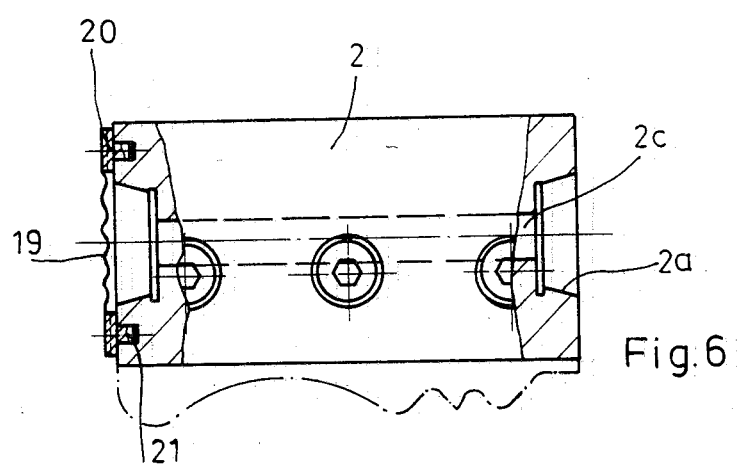
FIG. 6 is a lateral elevation of the removed planer head.

In order to effect the drive of the planer head 2, the bearing journal 7 is provided, over a part of its length (FIG. 4), with a hexagonal outer contour. A hexagonal sleeve 17 having a corresponding hexagonal configuration is slid over this area, which at its end facing the planer head 2 includes a flange in the form of a corrugated ring 18. This corrugated ring is positively connected, via the corrugations, with a corrugated ring 19 (see FIG. 6) of a similar corrugation, the latter being solidly joined with an annular flange 20. The flange 20 is connected by means of a journal 21 for rotation with the planer head 2 (FIG. 6). The sleeve is pressed by two flat springs 22 which abut a shoulder 17a of the sleeve 17 which interconnects the corrugated ring 18 with a cylindrical portion of the sleeve. The springs 22 press the sleeve against the corrugated ring 19. For this purpose, the flat springs 22 rest against a washer 23 of the stationary bearing 8. The drive connection has the advantage that the torque to be transmitted by the corrugated ring coupling from the drive wheel 3 to the planer head 2 may be limited to a certain value, above which value the corrugated rings become disengaged against the force of the flat springs 22, so that further rotation of the planer head 2 is prevented.

It is advantageous further that the planer head 2 may be removed in a very simple and rapid manner from the plane housing 1 by releasing the threaded bolt 15, as shown in FIG. 5, from the bearing journal 14. The bearing journal 14 is then extracted to the right into a recess 24 of the housing 1 until the stop of the cone 14c bottoms-out, so that the planer head may be removed and replaced by another one. The planer head is then moved to the right and removed together with the corrugated ring 19 (FIG. 6). The new planer head to be installed may be equipped with a new corrugated ring. Of course, the replacement of the corrugated ring is also possible.

Figure 7:
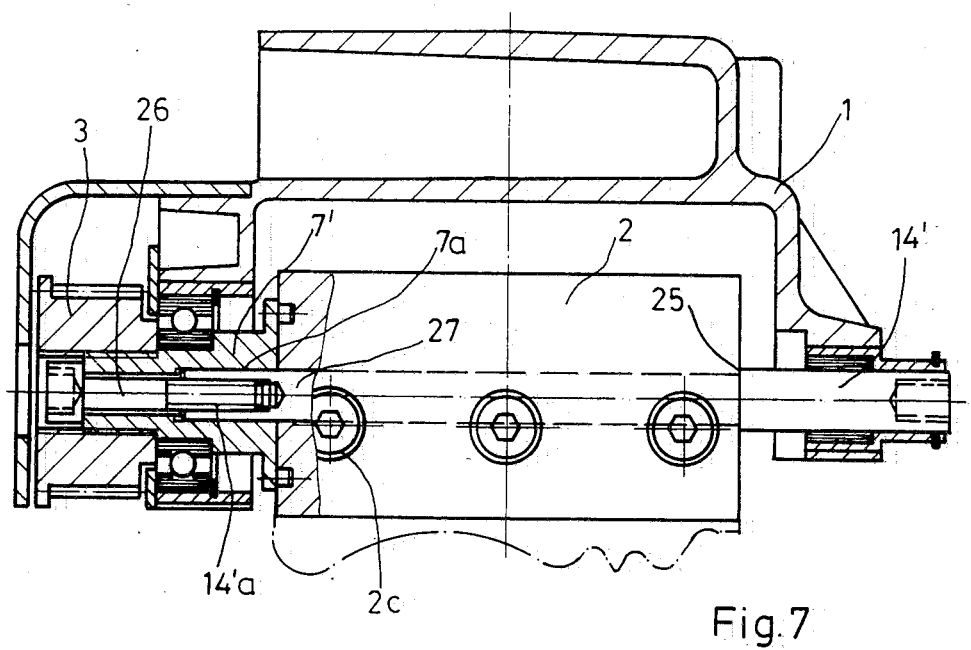
FIG. 7 is a section similar to that of FIG. 3, but showing a different embodiment of a manual plane according to the present invention.
Figure 8:
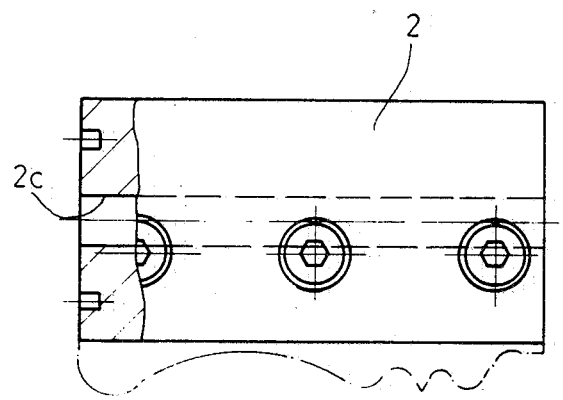
FIG. 8 depicts the dismantled planer head of the embodiment of FIG. 7.

FIGS. 7, 8 and 9 show a further preferred embodiment of the invention, wherein instead of a corrugated ring, another type of slip coupling is provided. An insertion bolt 27 passing through the planer head 2 is in the form of a single piece along with the bearing journal 14'. The journal bearing 14' includes an axial stop 25 from which the bearing 14' extends, with reduced diameter, into the bearing journal 7'. The latter has, similarly to that of FIGS. 1 to 6, an axial bore 7a, which is aligned with the axial bore 2c of the planer head 2. A cap screw 26 is inserted through the axial bore 7a and connected with an internal thread 14'a of the part 27 to axially immobilize the planer head 2 between the bearing parts 7' and 14'. As depicted in FIG. 9, the planer head 2 can be easily removed by (i) unscrewing the cap 26, (ii) sliding the journal 27, 14' to the right, (iii) sliding the planer head 2 to the right, and (iv) removing the planer head 2 from the chamber in which it sits.

Figure 10:
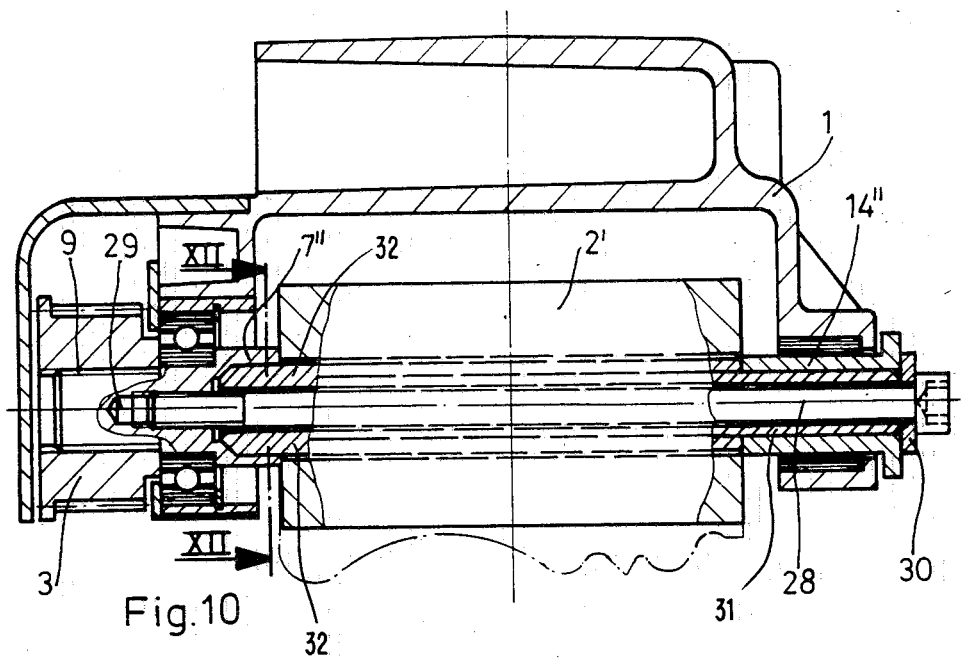
FIG. 10 depicts a section similar to that of FIG. 3, but of a further embodiment of a manual plane according to the present invention.
Figure 11:
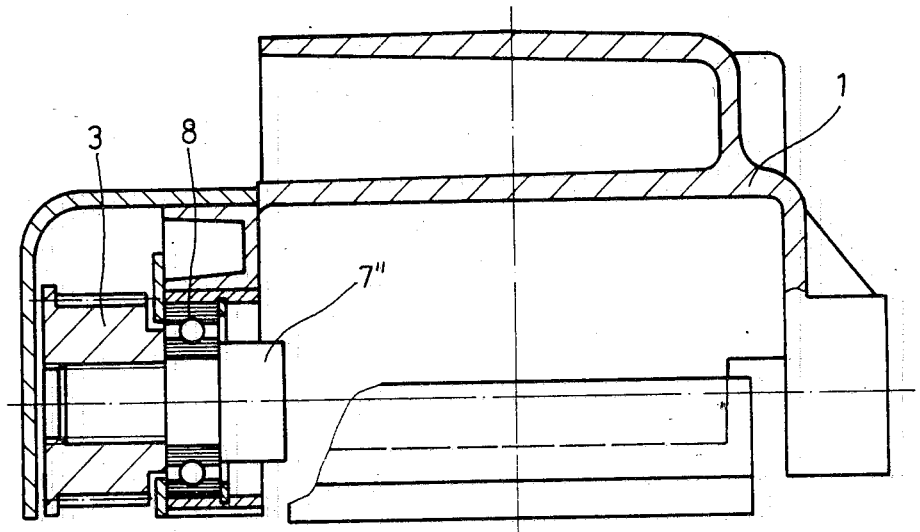
FIG. 11 depicts the manual plane of FIG. 10 with the planer head dismantled.
Figure 12:
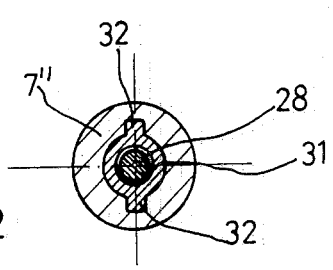
FIG. 12 depicts a section taken along line XII—XII in FIG. 10.

FIGS. 10 to 12 show a further possibility of effecting a rapid replacement of the planer head 2. Here the bearing journal 7" is not provided with an axial bore; instead, the bearing journal 14" is in the form of a bearing sleeve. A threaded bolt 28 is inserted through the bearing sleeve 14", which engages, through the planer head 2', a thread arranged in a blind hole 29 in the journal bearing 7". The bolt 28, with its stop 30 presses the bearing sleeve 14" and the planer head 2' against the journal bearing 7" seated in the stationary bearing 8. The bearing 7" abuts the planer head with its front pointing to the right. In order to establish a rotating connection in this configuration, a sleeve 31 is inserted into the planer head 2' and a part of the bearing journal 7", the sleeve being equipped with two opposing ribs 32, which positively engage the corresponding grooves in the plane head 2' and the bearing journal 7". The rotating motion actuated by the drive wheel 31 through the muliple key wedge joint 9 is therefore transmitted by the sleeve 31 positively locked in it to the planer head 2'. By removing the bolt 28, the bearing sleeve 14" and the sleeve 31 to the right in FIG. 11, the planer head 2 can be removed.

Although the present invention has been described in connection with preferred embodiments thereof, it will be appreciated by those skilled in the art that additions, modifications, substitutions, and deletions not specifically described, may be made without departing from the spirit and scope of the invention, as defined in the appended claims.

What is claimed is:

1. A planning tool comprising:
a housing;
an electric motor mounted to said housing;
bearings carried by said housing;
drive shaft means supported radially and axially in said bearings;
a drive wheel connected to said drive shaft means and to said electric motor to transmit rotary motion from the latter to the former;
a planer head having an axial throughbore and being connected to said drive shaft means for rotation therewith;
said drive shaft means comprising:
a pair of bearing journals rotatably mounted in said bearings at opposite ends of said planer head, one of said bearing journals being drivably connected with said planer head and said drive wheel for transmitting rotary motion to said planer head from said drive wheel, and threaded bolt means extending through said throughbore and being operably connected with said bearing journals for urging said planer head and said bearing journals tightly together for common rotation, said bolt means being removable from said throughbore to permit replacement of said planer head, one of said bearing journals being axially slidable in its respective bearing and being movable axially away from said planer head in response to loosening of said bolt to accommodate removal of said planer head.

2. A planing tool according to claim 1, wherein said planer head includes conical recesses at opposite ends thereof, said throughbore being coaxial with said recesses, said bearing journals each including a centering cone aligned with a respective recess, said bolt means extending completely through one of said bearing journals and including a head engaging an end thereof, said bolt means being threadedly connected to the other bearing journal such that tightening of said bolt means draws said cones into said recesses, said bearing journal to which said bolt means is threadedly connected constituting said one of said bearing journals which is axially movable away from said planer head in response to loosening of said bolt means.

3. A planing tool according to claim 1, wherein said one of said bearing journals which is coupled to said drive wheel is held against axial movement in its associated bearing, the other of said bearing journals constituting said one of said bearing journals which is axially slidable within its associated bearing.

4. A planing tool according to claim 1, wherein said bearing journals each include a centering cone facing the respective end of said planer head, said cones engaging correspondingly shaped recesses in said planer head.

5. A planing tool according to claim 4, wherein said bearing journal which transmits rotary motion to said planer head has a releasable coupling interconnecting said one bearing journal with said planer head.

6. A planing tool according to claim 5, wherein said releasable coupling comprises a first ring mounted for axial movement on said last-named bearing journal, a second ring carried by said planer head, and spring means yieldably urging said first ring toward said second ring, said first and second rings including mutually abutting corrugated surfaces forming a releasable drive therebetween.

7. A planing tool according to claim 6, wherein said first ring forms part of a sleeve having a non-circular inner recess which fits over a corresponding non-circular periphery of said last-named bearing journal.

* * * * *